United States Patent
Ac et al.

(10) Patent No.: US 10,724,400 B2
(45) Date of Patent: Jul. 28, 2020

(54) SUPPORT ASSEMBLY HAVING VARIABLE STIFFNESS MEMBER

(71) Applicant: General Electric Company, Schenectady, NY (US)

(72) Inventors: Shivaram Ac, Bangalore (IN); Vidyashankar Ramasastry Buravalla, Bangalore (IN); Ravindra Shankar Ganiger, Bangalore (IN); Shuvajyoti Ghosh, Bangalore (IN); Akash Joshi, Bangalore (IN)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 15/949,427

(22) Filed: Apr. 10, 2018

(65) Prior Publication Data

US 2018/0298822 A1    Oct. 18, 2018

(30) Foreign Application Priority Data

Apr. 14, 2017 (IN) .............................. 201741013386

(51) Int. Cl.
*F01D 25/16* (2006.01)
*F02C 7/20* (2006.01)
(Continued)

(52) U.S. Cl.
CPC .............. *F01D 25/164* (2013.01); *F02C 7/06* (2013.01); *F02C 7/20* (2013.01); *F16C 19/26* (2013.01);
(Continued)

(58) Field of Classification Search
CPC ........... F05D 2220/323; F05D 2240/50; F05D 2240/54; F05D 2240/90; F05D 2260/96;
(Continued)

(56) References Cited

U.S. PATENT DOCUMENTS

| 5,320,134 A | 6/1994 | Singh |
| 6,109,022 A * | 8/2000 | Allen ..................... F01D 5/025 |
| | | 60/223 |

(Continued)

FOREIGN PATENT DOCUMENTS

| EP | 2339131 A1 | 6/2011 |
| JP | H06200933 A | 7/1994 |

OTHER PUBLICATIONS

Barbarino, S., et al., "A review on shape memory alloys with applications to morphing aircraft," Smart Materials and Structures, vol. 23, Issue 6, pp. 1-19 (Apr. 10, 2014).

(Continued)

*Primary Examiner* — Christopher Verdier
*Assistant Examiner* — Sang K Kim
(74) *Attorney, Agent, or Firm* — Dority & Manning, P.A.

(57) ABSTRACT

A support assembly for a load-bearing unit, a gas turbine engine including the support assembly, and a method of operation of the support assembly are provided. The support assembly includes a support element, a damper, and a variable stiffness member. The support element supports the load-bearing unit. The damper supports the support element and is configured to provide dampening of the load-bearing unit. The variable stiffness member is positioned between the damper and the load-bearing unit. The variable stiffness member is configured to provide a serial dampening of the load-bearing unit with the damper. The variable stiffness member includes a shape memory alloy.

20 Claims, 10 Drawing Sheets

(51) Int. Cl.
    *F16F 15/02*     (2006.01)
    *F16C 19/54*     (2006.01)
    *F16F 15/023*     (2006.01)
    *F02C 7/06*     (2006.01)
    *F16C 19/26*     (2006.01)
    *F16C 27/04*     (2006.01)
    *F16C 27/06*     (2006.01)
    *F16F 1/22*     (2006.01)

(52) U.S. Cl.
    CPC ............ *F16C 19/54* (2013.01); *F16C 27/045* (2013.01); *F16C 27/066* (2013.01); *F16F 15/022* (2013.01); *F16F 15/0237* (2013.01); *F05D 2220/323* (2013.01); *F05D 2240/50* (2013.01); *F05D 2240/54* (2013.01); *F05D 2240/90* (2013.01); *F05D 2260/96* (2013.01); *F05D 2300/505* (2013.01); *F16C 2360/23* (2013.01); *F16F 1/22* (2013.01); *F16F 2222/02* (2013.01); *F16F 2224/0258* (2013.01); *F16F 2228/066* (2013.01); *F16F 2230/183* (2013.01)

(58) Field of Classification Search
    CPC ............. F05D 2300/505; F01D 25/164; F01D 25/162; F02C 7/20; F02C 7/06; F16C 19/26; F16C 19/54; F16C 27/045; F16C 27/066; F16F 15/022; F16F 15/0237
    See application file for complete search history.

(56) References Cited

U.S. PATENT DOCUMENTS

| | | | |
|---|---|---|---|
| 6,325,546 B1 | 12/2001 | Storace | |
| 7,004,047 B2 | 2/2006 | Rey et al. | |
| 7,097,413 B2* | 8/2006 | VanDuyn | ................ F01D 21/08 415/142 |
| 7,749,341 B2 | 7/2010 | Noebe et al. | |
| 8,136,999 B2 | 3/2012 | Mons et al. | |
| 8,267,650 B2 | 9/2012 | Alam et al. | |
| 8,291,710 B2 | 10/2012 | Webster | |
| 8,409,691 B1 | 4/2013 | Henry et al. | |
| 8,430,622 B2 | 4/2013 | Webster et al. | |
| 8,434,293 B2 | 5/2013 | Widdle, Jr. et al. | |
| 8,662,756 B2 | 3/2014 | Care et al. | |
| 8,834,095 B2 | 9/2014 | Davis | |
| 8,882,453 B2* | 11/2014 | Rousselin | ............... F01D 5/082 415/173.7 |
| 8,945,325 B2 | 2/2015 | Everhart et al. | |
| 2008/0181763 A1* | 7/2008 | Webster | ................ F01D 21/045 415/9 |
| 2012/0056005 A1 | 3/2012 | Webster | |
| 2014/0369830 A1 | 12/2014 | Fletcher et al. | |
| 2015/0144256 A1 | 5/2015 | Fabre et al. | |
| 2016/0229519 A1 | 8/2016 | Dilligan et al. | |
| 2017/0234157 A1* | 8/2017 | Khan | ...................... F01D 21/00 415/229 |
| 2018/0112554 A1 | 4/2018 | Ghosh et al. | |
| 2018/0112672 A1* | 4/2018 | Ganiger | .................... F02K 3/06 |
| 2018/0135596 A1 | 5/2018 | Herrig et al. | |
| 2019/0063261 A1* | 2/2019 | Varney | .................. F01D 25/164 |

OTHER PUBLICATIONS

Stebner, P.A., "Development, Characterization, and Application of Ni19.5Ti50.5Pd25Pt5 High-Temperature Shape Memory Alloy Helical Actuators," A Thesis Presented to the Graduate Faculty of the University of Akron, pp. 1-110 (Dec. 2007).

Wischt, R.J., and Garafolo, N. G., "Variable Stiffness Technique for Turbomachinery using Shape Memory Alloys," 56th AIAA/ASCE/AHS/ASC Structures, Structural Dynamics, and Materials Conference, pp. 1-13 (Jan. 5-9, 2015).

Joshi, A., et al., Turbine Bearing Support, GE Co-Pending Application No. 201641017921, filed on May 25, 2016.

Ac., S., Fan Assembly Having a Shape Memory Alloy Based Blade Tip Extension, GE Co-Pending Application No. 201641022484, filed on Jun. 30, 2016.

Canadian Office Action Corresponding to CA Application No. 3000360 dated Jan. 8, 2019.

* cited by examiner

SUPPORT ASSEMBLY HAVING VARIABLE STIFFNESS MEMBER

BACKGROUND OF THE INVENTION

The present disclosure relates generally to a load-bearing unit support assembly having a variable stiffness member. More specifically, the present disclosure relates to a support assembly of the load-bearing unit having a variable stiffness member positioned in between a damper and the load-bearing unit and a method of operating the support assembly.

A turbine engine generally includes a fan and a core arranged in flow communication with one another. In general, the core of the gas turbine engine includes, in serial flow order, a compressor section, a combustion section, a turbine section, and an exhaust section. In operation, air is provided from the fan to an inlet of the compressor section where one or more axial compressors compress the air progressively until it reaches the combustion section. A fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Conventional turbine engines such as, gas turbine engines include rotor assemblies having shafts, couplings, sealing packs, and other elements required for optimal operation under given operating conditions. These rotor assemblies have a mass that generates a constant static force mainly due to gravity, and a dynamic force mainly due to imbalances in the rotor assembly during operation. Such turbine engines include load-bearing units, such as bearings to sustain and support these forces while permitting rotation of the rotor assembly. The turbine engines may further have a support assembly for the bearing.

Support assembly may additionally include dampers, such as squeeze film dampers to provide dampening of the loads on the bearings. However, under no-oil conditions, as well as during conditions in which the rotor assemblies are subjected to a large amount of dynamic forces, the squeeze film dampers may not provide a desired amount of variable dampening that can change with respect to the dynamic forces. Accordingly, it is desirable to have a support assembly having features for providing additional and variable dampening for bearings during operation of a turbine engine.

BRIEF DESCRIPTION OF THE INVENTION

In accordance with some embodiments, a support assembly is provided for a load-bearing unit. The support assembly includes a support element, a damper, and a variable stiffness member. The support element supports the load-bearing unit. The damper supports the support element and is configured to provide dampening of the load-bearing unit. The variable stiffness member is positioned between the damper and the load-bearing unit. The variable stiffness member is configured to provide a serial dampening of the load-bearing unit with the damper. The variable stiffness member comprises a shape memory alloy.

In accordance with some embodiments, a gas turbine engine is provided. The gas turbine engine includes a compressor section and a turbine section arranged in serial flow order. The gas turbine engine also includes a shaft that can rotate in at least a portion of the compressor section and in at least a portion of the turbine section. The gas turbine further includes a bearing that supports rotation of the shaft, and a support assembly for the bearing. The support assembly includes a support element, a damper, and a variable stiffness member. The support element supports the bearing. The damper supports the support element, and is configured to provide dampening of the bearing. The variable stiffness member is positioned between the damper and the bearing. The variable stiffness member is configured to provide a serial dampening of the bearing with the damper. The variable stiffness member comprises a shape memory alloy.

In accordance with some embodiments, a method of operating a support assembly is disclosed. The support assembly includes a support element supporting a load-bearing unit, a damper supporting the support element, and a variable stiffness member positioned in between the damper and the load-bearing unit. The variable stiffness member includes a shape memory alloy. The method of operating the support assembly includes changing in-situ a stiffness of the variable stiffness member via heat transfer between a fluid and the shape memory alloy and providing a serial and variable dampening of the bearing during operation of the support assembly. The heat transfer may be achieved by passing the fluid proximal to the variable stiffness member.

BRIEF DESCRIPTION OF THE DRAWINGS

These and other features and aspects of embodiments of the present disclosure will become better understood when the following detailed description is read with reference to the accompanying drawings in which like characters represent like parts throughout the drawings. The accompanying drawings, which are incorporated in and constitute a part of this specification, illustrate embodiments of the disclosure and, together with the description, serve to explain the principles of the disclosure.

DETAILED DESCRIPTION

These and other features, aspects and advantages of the present disclosure will become better understood with reference to the following description and appended claims. The following detailed description illustrates embodiments of the disclosure by way of examples and not by way of limitation. It is contemplated that the disclosure has general application in providing enhanced sealing between rotating and stationary components in industrial, commercial, or residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

To more clearly and concisely describe and point out the subject matter, the following definitions are provided for specific terms, which are used throughout the following description and the appended claims, unless specifically denoted otherwise with respect to particular embodiments. As used herein, "supporting" implies "designed to take load." Thus, a support element supporting a load-bearing unit would imply that the support element is a load bearing member for the load-bearing unit. A "variable stiffness member" is a component that demonstrates variation in stiffness with respect to variation in temperature experienced by the component. The recitation "a variable stiffness member configured to provide a serial dampening of the load-bearing unit with the damper" refers to different configurations of the variable stiffness member that dampens the load and vibrations of the load-bearing unit in series with the damper. A "serial and variable dampening" refers to the variable dampening achieved by using a variable stiffness member in a serial manner with the damper. A shape-memory alloy is a material that is designed to change shape and/or stiffness in response to certain range of temperatures. A "fluid" is a substance that changes shape with the application of a force. A fluid may be a liquid or a gas.

Figure 1:
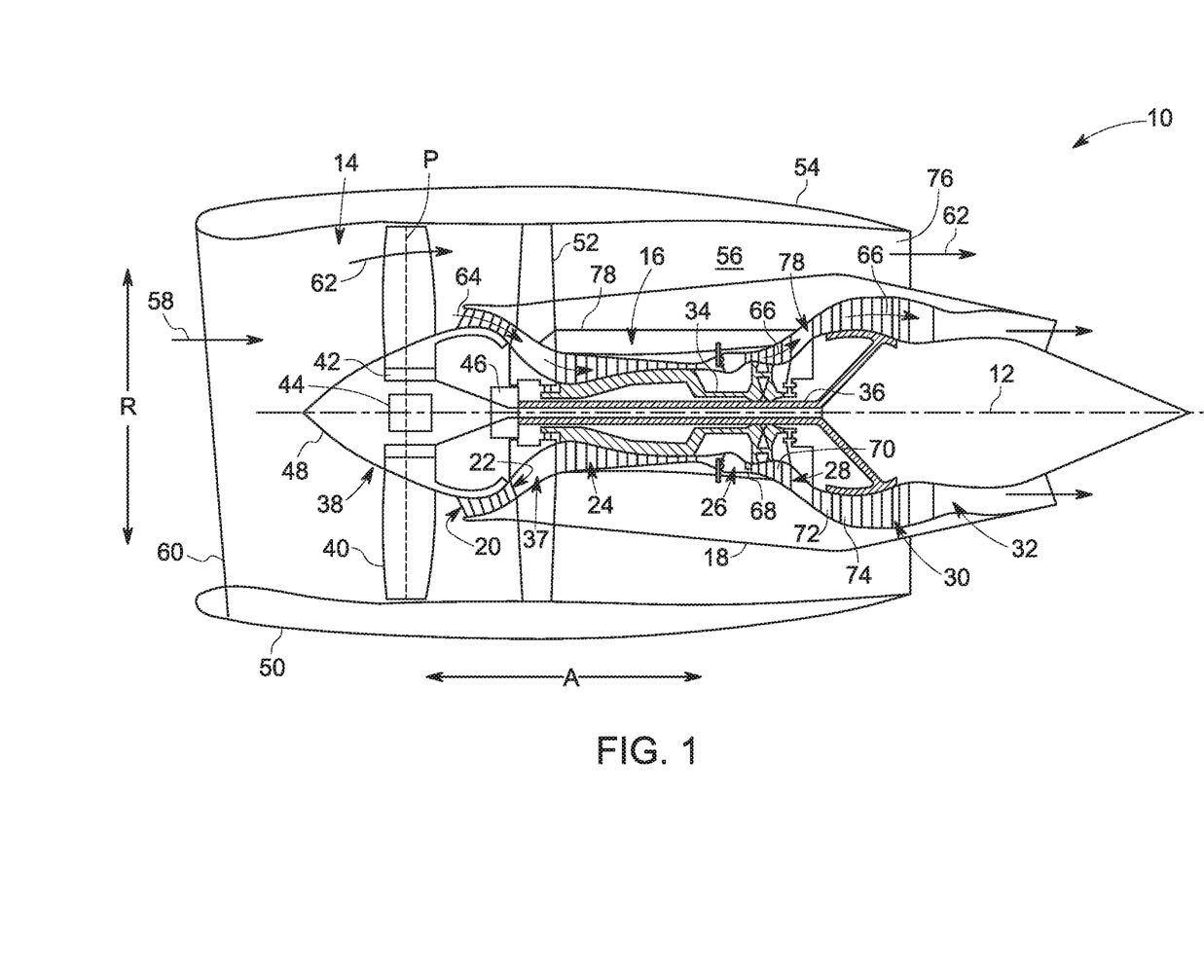
FIG. 1 is a schematic, cross-sectional view of a gas turbine engine in accordance with some embodiments of the present disclosure.

Referring now to the drawings, FIG. 1 is a schematic cross-sectional view of a gas turbine engine in accordance with some embodiments of the present disclosure. In some embodiments, the gas turbine engine depicted in FIG. 1 is a high-bypass turbofan jet engine, referred to herein as "turbine engine" 10. As shown in FIG. 1, the turbine engine 10 defines an axial direction A (extending parallel to a longitudinal centerline axis 12 provided for reference) and a radial direction R. In general, the turbine engine 10 includes a fan section 14 and a core turbine engine 16 disposed downstream of the fan section 14.

The core turbine engine 16 generally includes a substantially tubular outer casing 18 that defines an annular inlet 20. The outer casing 18 encases, in serial flow relationship, a compressor section including a booster or low pressure (LP) compressor 22 and a high pressure (HP) compressor 24, a combustion section 26, a turbine section including a high pressure (HP) turbine 28 and a low pressure (LP) turbine 30, and a jet exhaust nozzle section 32. A high pressure (HP) shaft 34 connects the HP turbine 28 to the HP compressor 24. A low pressure (LP) shaft 36 drivingly connects the LP turbine 30 to the LP compressor 22. The compressor section, combustion section 26, turbine section, and nozzle section 32 together define a core air flowpath 37.

For the depicted embodiment, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal centerline axis 12 by LP shaft 36 across a power gear box 46. The power gear box 46 includes a plurality of gears for adjusting the rotational speed of the fan 38 relative to the LP shaft 36 to a more efficient rotational fan speed.

Referring to the exemplary embodiment of FIG. 1, the disk 42 is covered by a rotatable front hub 48 aerodynamically contoured to promote an airflow through the plurality of fan blades 40. Additionally, the fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically, into the LP compressor 22. The ratio between the first portion of air and the second portion of air is commonly known as a bypass ratio. Depending on the bypass ratio, the turbine engine 10 may be referred to as an ultra-high bypass turbine engine. The pressure of the second portion of air is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air is substantially increased as the first portion of air is routed through the bypass airflow passage 56 before it is exhausted from a fan nozzle exhaust section 76 of the turbine engine 10, also providing propulsive thrust.

The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is provided by way of example only, and that in other exemplary embodiments, the turbine engine 10 may have any other suitable configuration. Further, aspects of the present disclosure may be incorporated into any other suitable gas turbine engine. For example, in other example embodiments, aspects of the present disclosure may be incorporated into, e.g., a turboprop engine, a turboshaft engine, or a turbojet engine.

Figure 2:
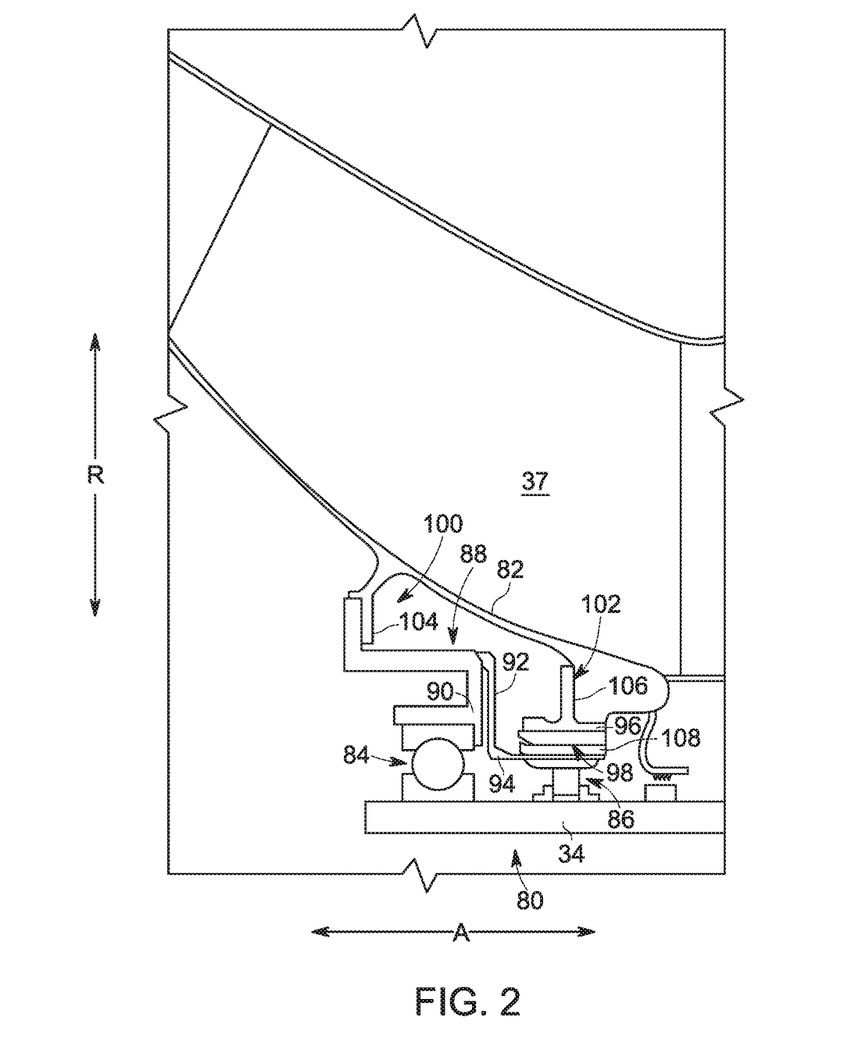
FIG. 2 is a close-up, schematic view of a compressor section of the gas turbine engine of FIG. 1.

Referring now to FIG. 2, a close-up view of a section of the compressor section of the turbine engine 10 of FIG. 1 is provided. Specifically, FIG. 2 shows a forward end 80 of the HP shaft 34. The forward end 80 of the HP shaft 34 is positioned within the compressor section of the turbine engine 10, radially inward of the core air flowpath 37. Notably, for the depicted embodiment, the core air flowpath 37 is defined at least in part by a static frame 82 within the compressor section of the turbine engine 10. For the illustrated embodiment, the static frame 82 is configured as a single piece unit. However, in some other embodiments, the static frame 82 may instead be formed of a plurality of members attached and configured in any suitable manner.

Referring to FIG. 2, the turbine engine 10 includes a bearing supporting rotation of the HP shaft 34 at the forward end 80. More particularly, the turbine engine 10 includes a forward bearing 84 and an aft bearing 86, the forward and aft bearings 84, 86 each supporting rotation of the HP shaft 34 at the forward end 80 of the HP shaft 34. In these embodiments, the bearing is a load-bearing unit designed to bear the load of the shaft 34. In the illustrated embodiment, the forward bearing 84 is configured as a ball bearing and the aft bearing 86 is configured as a roller element bearing. It should be appreciated however that in other embodiments, the forward and/or aft bearings 84, 86 may instead have any other suitable form or configuration. Further, in some other embodiments, the turbine engine 10 may only include a single bearing for supporting the forward end 80 of the HP shaft 34.

The turbine engine 10 additionally includes a support element 88 supporting the bearing supporting both the forward bearing 84 and the aft bearing 86. More particularly, the support element 88 depicted includes a plurality of individual ribs spaced along a circumferential direction C (see, for example, FIG. 4). The plurality of ribs includes forward bearing support ribs 90 and aft bearing support ribs 92. In the embodiment shown in FIG. 2, the support element 88 is configured as "squirrel casing" for the forward and aft bearings 84, 86. Additionally, the aft bearing support ribs 92 include an axial member 94 extending generally along the axial direction A for supporting the aft bearing 86. The ribs 90, 92 of the support element 88 may be formed of a material (e.g., a metal) capable of bending or flexing during operation of the turbine engine 10 to provide a certain amount of dampening for the forward and aft bearings 84, 86.

Figure 3:
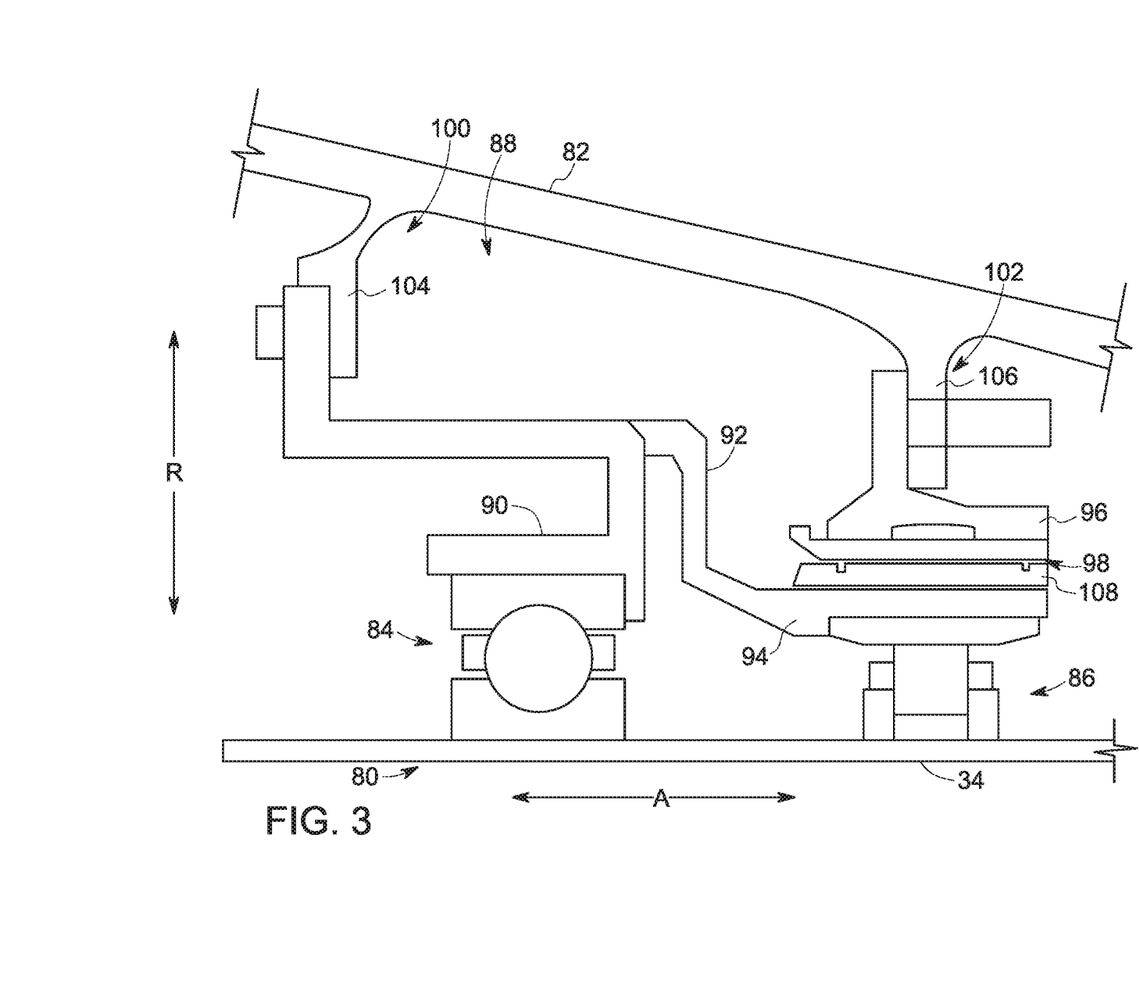
FIG. 3 is a close-up, schematic view of a support assembly in accordance with some embodiments of the present disclosure.

FIG. 3, provides a close-up view of the forward and aft bearings 84, 86 of FIG. 2. In FIG. 3, the turbine engine 10 further includes a damper (e.g., a squeeze film damper 96) for providing additional dampening of the aft bearing 86. The squeeze film damper 96 receives a flow of fluid such as a lubrication oil during operation. The squeeze film damper 96 provides such fluid to a support surface 98 to generate a thin film of such fluid. Dynamic forces acting on the HP shaft 34 and aft bearing 86 may be absorbed or dampened by squeezing out the fluid on the support surface 98. Notably, the support element 88 is attached to the static frame 82 at a first location 100 and, for the employment depicted, the squeeze film damper 96 is attached to the static frame 82 at a second location 102. More particularly, the support member is attached directly, without any intervening components, to a first attachment flange 104 of the static frame 82 at the first location 100 and the squeeze film damper 96 is attached directly to a second attachment flange 106 of the static frame 82 at the second location 102. The first location 100 is spaced from the second location 102. Specifically, for the embodiment depicted, the first location 100 is spaced from the second location 102 at least as far as the forward bearing 84 is spaced from the aft bearing 86.

It may be beneficial for gas turbine engines to include longer and/or thinner shafts, such as longer and/or thinner HP shaft 34 or LP shafts 36, to reduce a weight of the engine. However, such longer or thinner shafts may lead to a low bending stiffness of the shaft and therefore exhibiting large bow mode vibrations in response to dynamic forces acting thereon. For example, such engines may result in undesirably large whirl when experiencing dynamic forces, and may also result in the shaft rubbing against other components within the turbine engine 10.

Accordingly, in order to further dampening to the bearings, the support system of the present turbine engine 10 further includes a variable stiffness member 108 supporting at least one of the support element 88 or a bearing, such as the forward bearing 84 or aft bearing 86. The variable stiffness member 108 includes a shape memory alloy. The variable stiffness member is positioned in between the damper and the support element. In some other embodiments, the variable stiffness member may be positioned in between the support element and the bearing.

For the embodiment depicted, the variable stiffness member 108 supports the aft bearing 86. As will be appreciated, for the embodiment depicted, the variable stiffness member 108 is attached to the second attachment flange 106 of the static frame 82 at the second location 102 through the squeeze film damper 96. As stated above, the support element 88 supports the aft bearing 86 and includes the axial member 94 (of the aft bearing support ribs 92) positioned adjacent to the aft bearing 86. The variable stiffness member 108 is positioned adjacent to the support element 88 (or more particularly adjacent to the axial member 94 of the support element 88), such that the variable stiffness member 108 supports the aft bearing 86 through the support element 88. In some embodiments, the variable stiffness member is free of any direct attachment with the static frame. In some embodiments, wherein the variable stiffness member is free of any direct attachment with the static frame, the dampening due to the variable stiffness member does not directly transfer to the static frame. Thus, in some embodiments, the dampening transfers from the bearing to the static frame through the variable stiffness member discussed herein along with the squeeze film damper 96.

In FIGS. 2 and 3, the variable stiffness member 108 is positioned between the squeeze film damper 96 and the bearing, or more particularly, between the squeeze film damper 96 and the axial member 94 of the support element 88. Accordingly, for the embodiment depicted, the variable stiffness member 108 and squeeze film damper 96 act in series to support the aft bearing 86.

Figure 4:
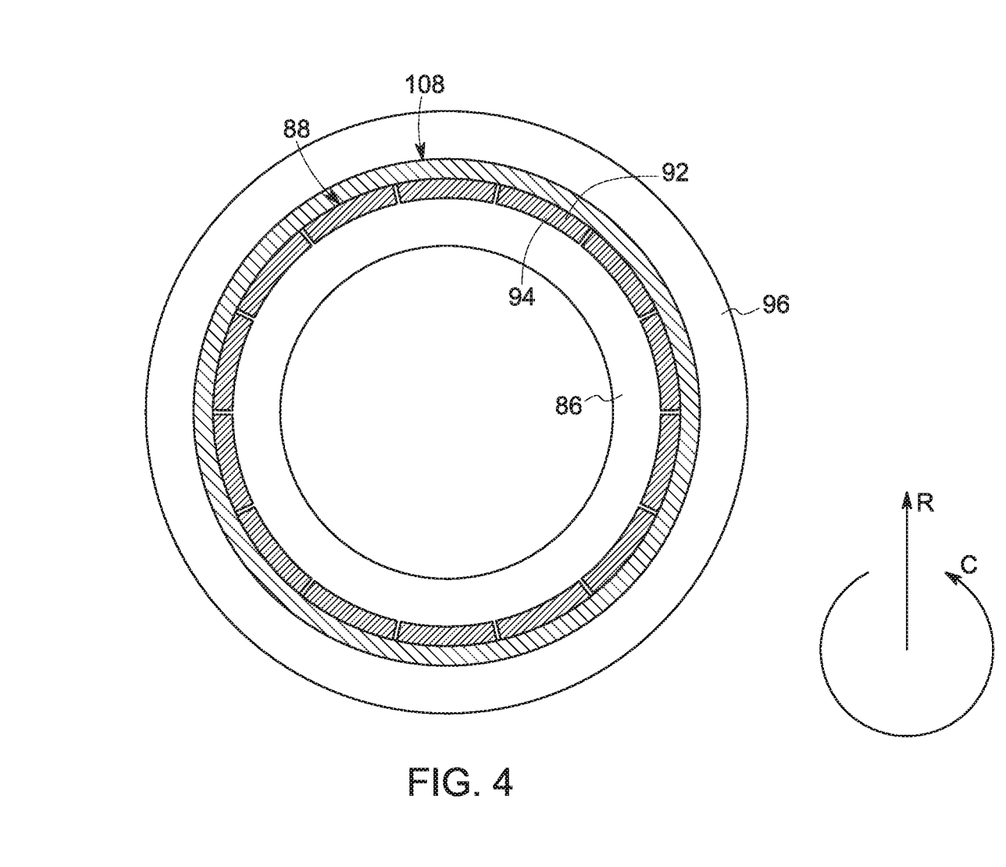
FIG. 4 is an axial, cross-sectional view of an exemplary support assembly of FIG. 3.

FIG. 4 provides an axial view of the aft bearing 86 and the plurality of members supporting the aft bearing 86. For example, FIG. 4 schematically depicts the bearing 86, the support element 88, the variable stiffness member 108, and the squeeze film damper 96. For the embodiments described in FIGS. 2 through 4, the variable stiffness member 108 extends substantially continuously along the circumferential direction C.

Figure 5:
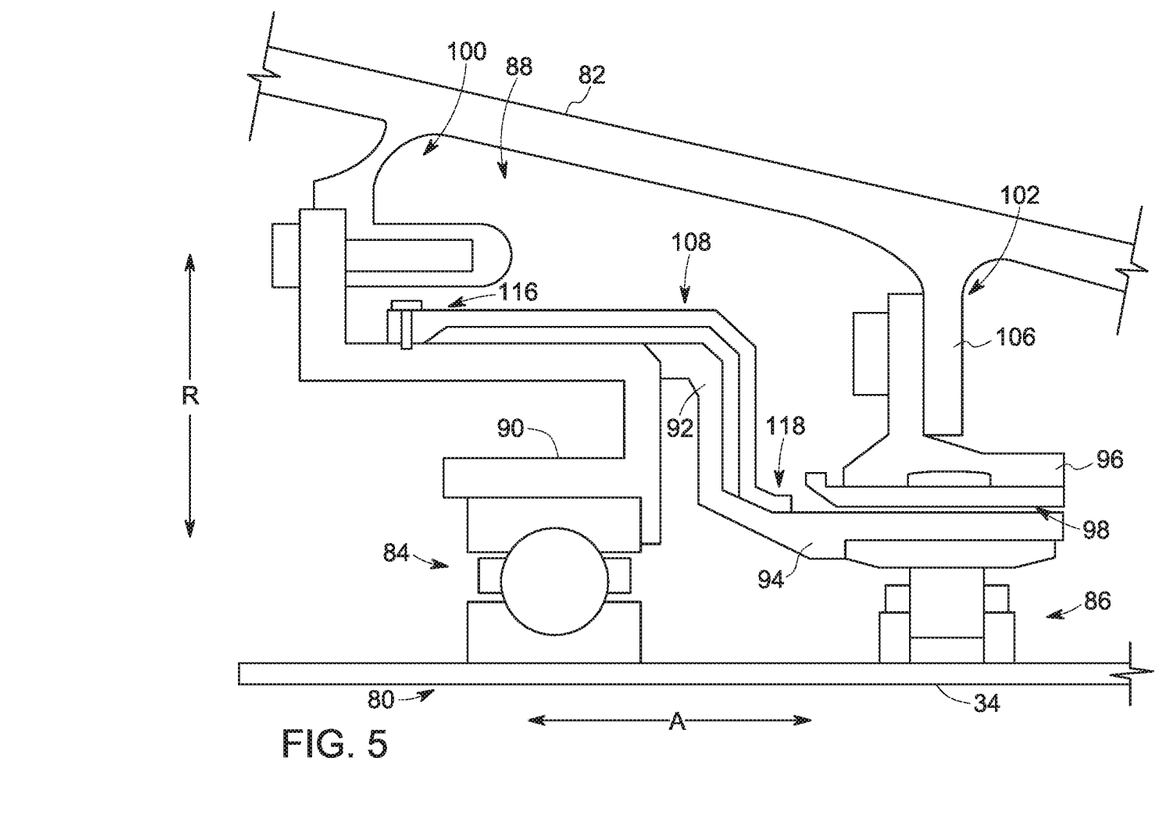
FIG. 5 is a close-up, schematic view of a support assembly in accordance with another embodiment of the present disclosure.

Referring now to FIG. 5, an example variable stiffness members 108 is depicted as installed in a gas turbine engine, in accordance with an embodiment of the present disclosure. The turbine engine 10 depicted in FIG. 5 may be configured in substantially the same manner as turbine engine 10 described in FIGS. 1-3. In FIG. 5, the turbine engine 10 includes a forward bearing 84 and an aft bearing 86, each supporting the HP shaft 34. The forward and aft bearings 84, 86 are supported by a support element 88 attached to a static frame 82 at a first location 100 of the static frame 82. Additionally, the aft bearing 86 is supported by a squeeze film damper 96 attached to the static frame 82 at a second location 102 of the static frame 82, the second location 102 being spaced from the first location 100. Additionally, the turbine engine 10 includes a variable stiffness member 108 formed of a shape memory alloy supporting at least one of the support element 88 or the bearing. In some embodiments, the support assembly of the turbine engine may include a plurality of variable stiffness members spaced along a circumferential direction of the turbine engine. Thus, in some embodiments, more than one variable stiffness member may be used in one support assembly. The multiple variable stiffness members in a radial direction may effectively and serially dampen the vibrations of the rotating shaft. In some embodiments, each of the plurality of variable stiffness members includes the shape memory alloy.

Further, the variable stiffness member 108 supports the support element 88. The variable stiffness member 108 extends between a first end 116, which is attached to the static frame 82 at the first location 100, and a second end 118. The second end 118 is positioned adjacent to the support element 88 at a location forward of the aft bearing 86, and closer to the forward bearing 84. In some embodiments, the variable stiffness member 108 is attached to the support element 88. Specifically, for the embodiment depicted, a section of the variable stiffness member 108 is attached directly to the support element 88, proximate the first location 100 of the static frame 82.

Different methods may be used to affix the variable stiffness member 108 to the support element, the methods including, but not limited to, physical joining, chemical joining, or mechanical joining. In some embodiments, the variable stiffness member 108 is mechanically joined to the support element 88, including, without limitation, via embedding, adhesive joining, capping, and attaching by using nut and bolts or rivets. In some embodiments, the variable stiffness member 108 may be at least partially embedded in the support element 88, without damaging and/or modifying the support element 88. Further, the variable stiffness member 108 may be removed and/or replaced with another one without damaging the support element 88.

Although reference has been made to affixing the variable stiffness member 108 having a shape memory alloy onto the support element 88, a variable stiffness member 108 having the shape memory alloy of the present disclosure may also be manufactured integrally along with the support element 88 and the desired low temperature and high temperature stiffness may be imparted to the variable stiffness member 108 as desired.

In the embodiments of the present disclosure, the variable stiffness member is positioned between the damper and the load-bearing unit. The variable stiffness member includes a shape memory alloy. The variable stiffness of the variable stiffness member 108 is a result of the variable stiffness associated with the shape memory alloy part of the variable stiffness member 108. In some embodiments, the variable stiffness member 108 includes the shape memory alloy as a major constituent, in an amount greater than 50 wt. % of the variable stiffness member 108. In certain embodiments, the variable stiffness member 108 is essentially composed of the shape memory alloy. A shape-memory alloy provides varying stiffness, in a pre-determined manner, in response to certain range of temperatures. The change in stiffness of the shape memory alloy is due to a temperature related, solid state micro-structural phase change that enables the alloy to change from one physical shape to another physical shape.

The changes in stiffness of the shape memory alloys may be developed by working and annealing a preform of the alloy at or above a temperature at which the solid state micro-structural phase change of the shape memory alloy occurs. The temperature at which such phase change occurs is generally referred to as the critical temperature or transition temperature of the alloy. In the manufacture of the variable stiffness member 108 intended to change stiffness during operation of the support assembly, the variable stiffness member 108 is formed to have one operative stiffness (e.g., a first stiffness) below a transition temperature and have another stiffness (e.g., a second stiffness) at or above the transition temperature.

Some shape memory alloys used herein are characterized by a temperature-dependent phase change. These phases include a martensite phase and an austenite phase. The martensite phase generally refers to a lower temperature phase whereas the austenite phase generally refers to a higher temperature phase. The martensite phase is generally more deformable, while the austenite phase is generally less deformable. When the shape memory alloy is in the martensite phase and is heated to above a certain temperature, the shape memory alloy begins to change into the austenite phase. The temperature at which this phenomenon starts is referred to as the austenite start temperature (As). The temperature at which this phenomenon is completed is called the austenite finish temperature (Af). When the shape memory alloy, which is in the austenite phase is cooled, it begins to transform into the martensite phase. The temperature at which this transformation starts is referred to as the martensite start temperature (Ms). The temperature at which the transformation to martensite phase is completed is called the martensite finish temperature (Mf). As used herein, the term "transition temperature" without any further qualifiers may refer to any of the martensite transition temperature and austenite transition temperature. Further, "below transition temperature" without the qualifier of "start temperature" or "finish temperature" generally refers to the temperature that is lower than the martensite finish temperature, and the "above transition temperature" without the qualifier of "start temperature" or "finish temperature" generally refers to the temperature that is greater than the austenite finish temperature.

In some embodiments, the variable stiffness member 108 has a first stiffness at a first temperature and has a second stiffness at a second temperature, wherein the second temperature is different from the first temperature. Further, in some embodiments, one of the first temperature and the second temperature is below the transition temperature and the other one may be at or above the transition temperature. Thus, in some embodiments, the first temperature may be below the transition temperature and the second temperature may be at or above the transition temperature, while in some other embodiments, the first temperature may be at or above the transition temperature and the second temperature may be below the transition temperature.

Suitable shape memory alloy materials that can be used as a variable stiffness member 108 for controlling dampening of the load-bearing unit (for example, a bearing), include, but are not limited to, nickel-aluminum based alloys, nickel-titanium based alloys, and copper-aluminum-nickel based alloys. The alloy composition is selected to provide the desired stiffness effect for the application such as, but not limited to, damping ability, transformation temperature and strain, the strain hysteresis, yield strength (of martensite and austenite phases), resistance to oxidation and hot corrosion, ability to change shape through repeated cycles, capability to exhibit one-way or two-way shape memory effect, and/or a number of other engineering design criteria. Suitable shape memory alloy compositions that may be employed with the embodiments of present disclosure may include, but are not limited to NiTi, NiTiHf, NiTiPt, NiTiPd, NiTiCu, NiTiNb, NiTiVd, TiNb, CuAlBe, CuZnAl and some ferrous based alloys. In some embodiments, NiTi alloys having transition temperatures between 5° C. and 150° C. are used. NiTi alloys change from austenite to martensite upon cooling.

The variable stiffness member 108 including the shape memory alloy may be made using vacuum melting (e.g., vacuum induction melting or vacuum arc melting) to form an ingot of the shape memory alloy composition, optionally followed by deformation processing, such as, rolling, extrusion, forging, drawing, and/or swaging. Alternatively, the variable stiffness member 108 may be manufactured by deposition (e.g., thermal spray, physical vapor deposition, vacuum arc deposition) or through powder consolidation. Once made, the variable stiffness member 108 may be heated to a temperature sufficient to impart the desired high temperature shape, for example, to a temperature above the austenite finish temperature.

Figure 6:
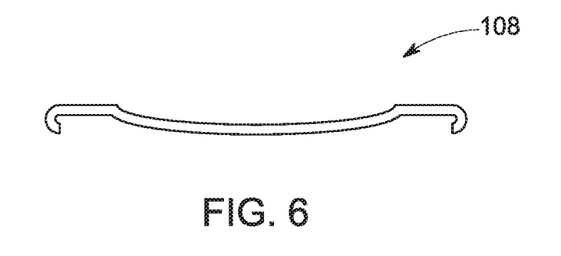
FIG. 6 is an isolated, side view of a variable stiffness member in accordance with an example embodiment of the present disclosure.
Figure 7:
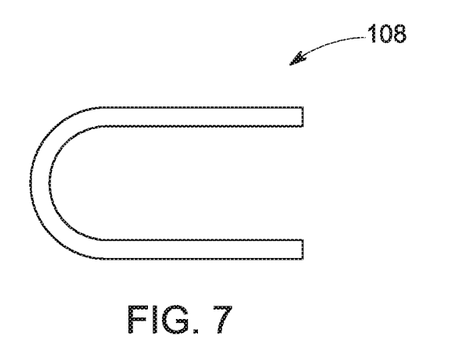
FIG. 7 is an isolated, side view of the example variable stiffness member.

FIGS. 6 and 7 provide isolated views of the variable stiffness member 108. FIG. 6 provides a view of the variable stiffness member 108 in a leaf structure, and FIG. 7 provides a view of the variable stiffness member 108 in a hair pin structure. Further, it should be appreciated that in still other embodiments, the variable stiffness member 108 may have any other suitable configuration for providing support/dampening to one or both of the support element 88 or a bearing such as the forward bearing 84 or the aft bearing 86. The leaf structure and the hairpin structures are suited to increase dampening of the bearing.

In some other embodiments, the variable stiffness member 108 may have any other suitable configuration for supporting at least one of the support element 88 or a bearing. For example, in other embodiments, the variable stiffness member 108 may be positioned to support one or more bearings for supporting a forward end 80 of an LP shaft, an aft end of the LP shaft, or an aft end of the HP shaft 34. Additionally, in some other embodiments, the turbine engine 10 may have any other suitable configuration. For example, the support element 88 may be configured in any other suitable manner for providing the benefits described herein.

In some embodiments, the variable stiffness member 108 is in a pre-stressed condition. The variable stiffness member in the pre-stressed condition shifts hysteresis cycle of the shape memory alloy variable stiffness member to a range of stresses that is different from that of a non-pre-stressed member. The pre-stressing further serves to maximize the damping function of the shape memory alloy variable stiffness member 108 so that the material is active at the maximum stresses generated. More particularly, placing the variable stiffness member 108 in a pre-stress position may allow for the variable stiffness member 108 to enter a hysteretic bending regime, without requiring a relatively large amount of displacement.

A stiffness change of the variable stiffness member 108 is effected by the corresponding change in stiffness of the shape memory alloy part of the variable stiffness member 108. In some embodiments, wherein the variable stiffness member 108 has the shape memory alloy as a major constituent, the change in stiffness of the shape memory alloy part of the variable stiffness member 108 may directly manifest as the change in stiffness of the variable stiffness member 108. The stiffness (stiffness at to first temperature and/or at a second temperature) of the variable stiffness member 108 may be pre-determined to achieve the desired variation in the stiffness of the support assembly at all normal operating conditions of the gas turbine engine 10. A change in temperature between the first stiffness and the second stiffness of the variable stiffness member 108 is effected by a change in the temperature of the variable stiffness member 108. Different methods may be used to change temperature of the variable stiffness member 108 at the required time duration and required amount. Non-limiting methods of changing temperature of the variable stiffness member 108 include electrical heating, induction heating, and heating by a heat transfer between the variable stiffness member 108 and a fluid. In some embodiments, the change in temperature of the variable stiffness member 108 for the change in stiffness is achieved by a heat transfer between the variable stiffness member 108 and a fluid.

In one aspect, a method of operating a support assembly, such as a support assembly in the gas turbine is disclosed. The support assembly includes a support element that supports a load-bearing unit, a damper supporting the support element, and a variable stiffness member positioned in between the damper and the load-bearing unit. The variable stiffness member includes a shape memory alloy. The method of operating the support assembly includes changing in-situ a stiffness of the variable stiffness member by heat transfer between the shape memory alloy and a fluid. In some embodiments, the variable stiffness member provides a variable stiffness along a radial direction towards the centerline axis of the gas turbine engine during normal operation of the gas turbine engine. The step of heat transfer between the variable stiffness member and the fluid includes passing the fluid in a position proximal to the variable stiffness member. In some embodiments, heat transfer between the fluid and the variable stiffness member is facilitated by spraying the fluid over the variable stiffness member. Any fluid that may be carrying the thermal energy to be transferred to the variable stiffness member or is capable of absorbing heat from the variable stiffness member may be used for the heat transfer. In some embodiments, a fluid that is already disposed in the system such as the gas turbine is employed for the heat transfer. Non-limiting examples of the fluids that can be used for heat transfer include air, exhaust gas, coolant fluid, or lubricating oil of the turbine engine. In some embodiments, the step of passing the fluid proximal to the variable stiffness member includes passing at least one of air, exhaust gas, coolant fluid, or lubricating oil in contact with the variable stiffness member. The fluids may be directed to or circulated in contact with the variable stiffness member. During passage of the fluid, the thermal energy of the fluid gets transferred to the variable stiffness member and changes the stiffness of the variable stiffness member thus providing a serial and variable dampening of the load-bearing unit during operation of the support assembly. The original or intermediate stiffness of the variable stiffness member may be achieved by passing a cool fluid or by at least partially disengaging the fluid flow proximal to the variable stiffness member. In some embodiments, the fluid may be passed through a heat exchanger to provide the required temperature to the fluid thus facilitating transfer of the exact temperature needed for a given stiffness of the variable stiffness member. Similarly, hot and relatively cool fluids may be mixed appropriately in a flow regulator to achieve required temperatures for heat transfer to the variable stiffness member. In some embodiments, the support assembly includes a fluid supply means to supply a fluid proximal to the variable stiffness member. The fluid supply means may include tubing, pump and/or any other structure that enables the supply of fluid for heat transfer with the variable stiffness member.

Figure 8:
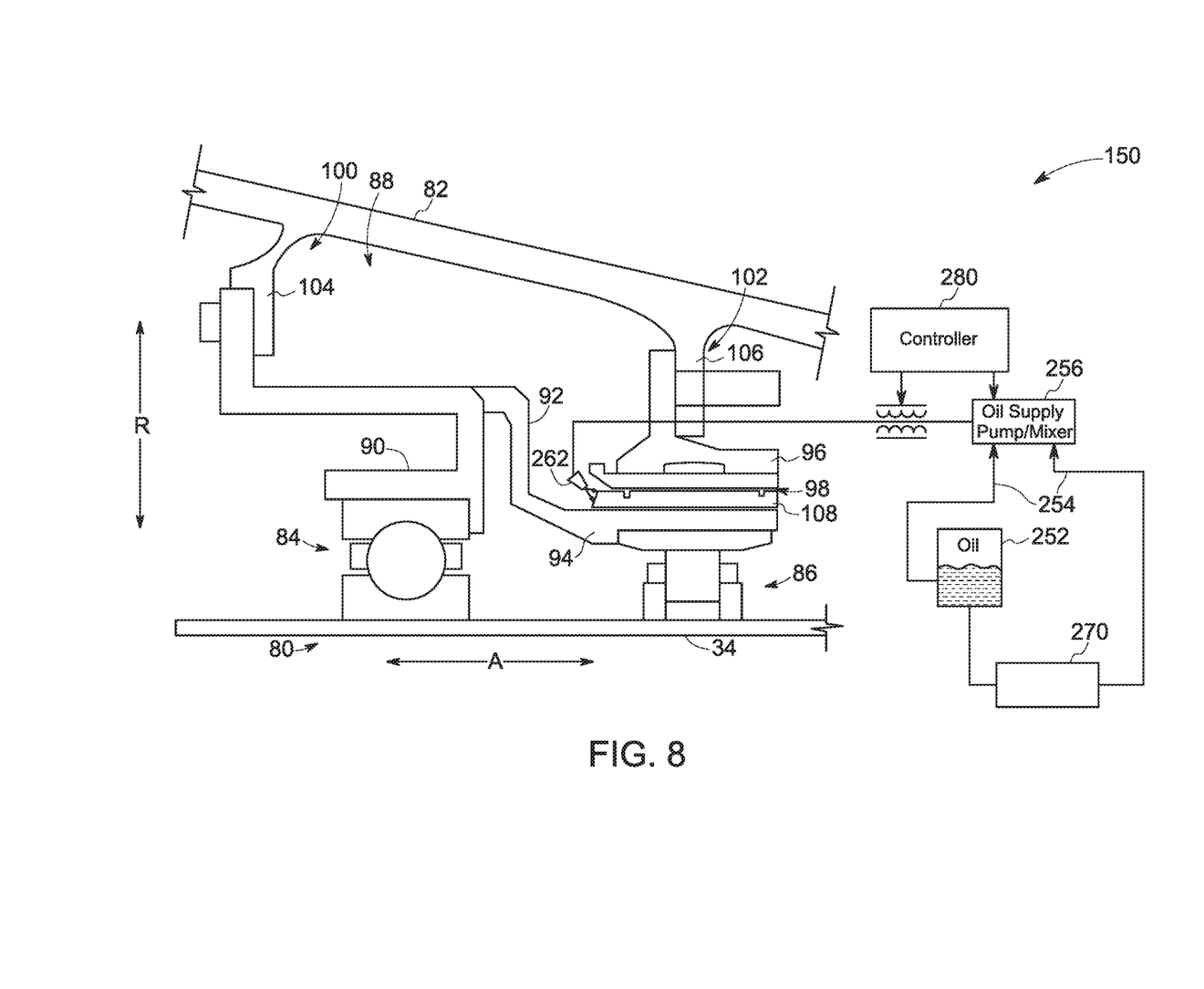
FIG. 8 is a close-up, schematic view of an arrangement having means for heat transfer between a fluid and a variable stiffness member, in accordance with some embodiments of the present disclosure.
Figure 9:
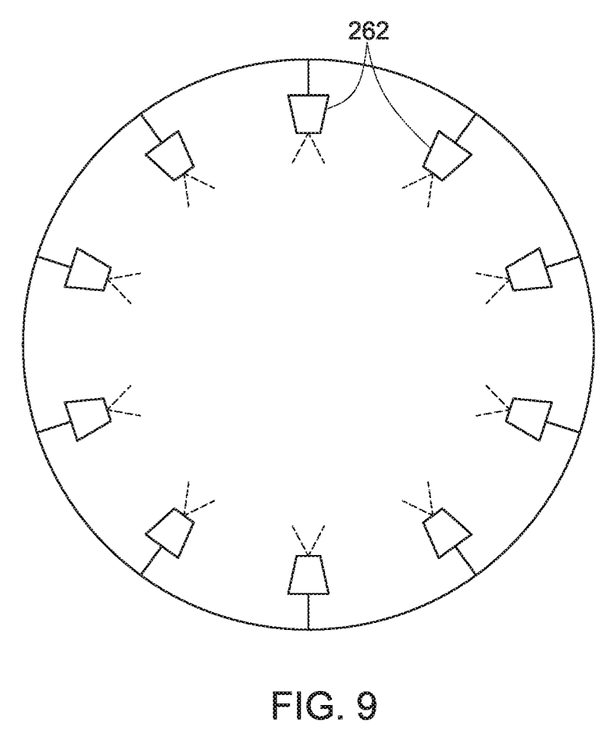
FIG. 9 shows an example arrangement of various nozzles for spraying lubricating oil around the variable stiffness member, in accordance with some embodiments of the present disclosure.

FIG. 8 illustrates a close-up, schematic view of an example arrangement 150 for an example method of fluid transfer to the variable stiffness member 108 of the support assembly. A lubricating oil may be supplied from an oil reservoir 252 through one or more manifolds 254 to an oil supply pump 256 that transfers the lubricating oil to the proximity of the variable stiffness member through a pipe 258 and sprays the lubricating oil through a nozzle 262. A heat exchanger 270 may be utilized to vary the temperature of the lubricating oil and a controller 280 may be used to control the flow of the lubricating oil. A control algorithm of the controller 280 may be used to for the decision about passing the fluid proximal to the variable stiffness member. Thus, in some embodiments, the step of passing the fluid proximal to the variable stiffness member is in response to a control algorithm of the support assembly. FIG. 9 shows an exemplary arrangement of various nozzles 262 that may be placed around the variable stiffness member 108.

Figure 10:
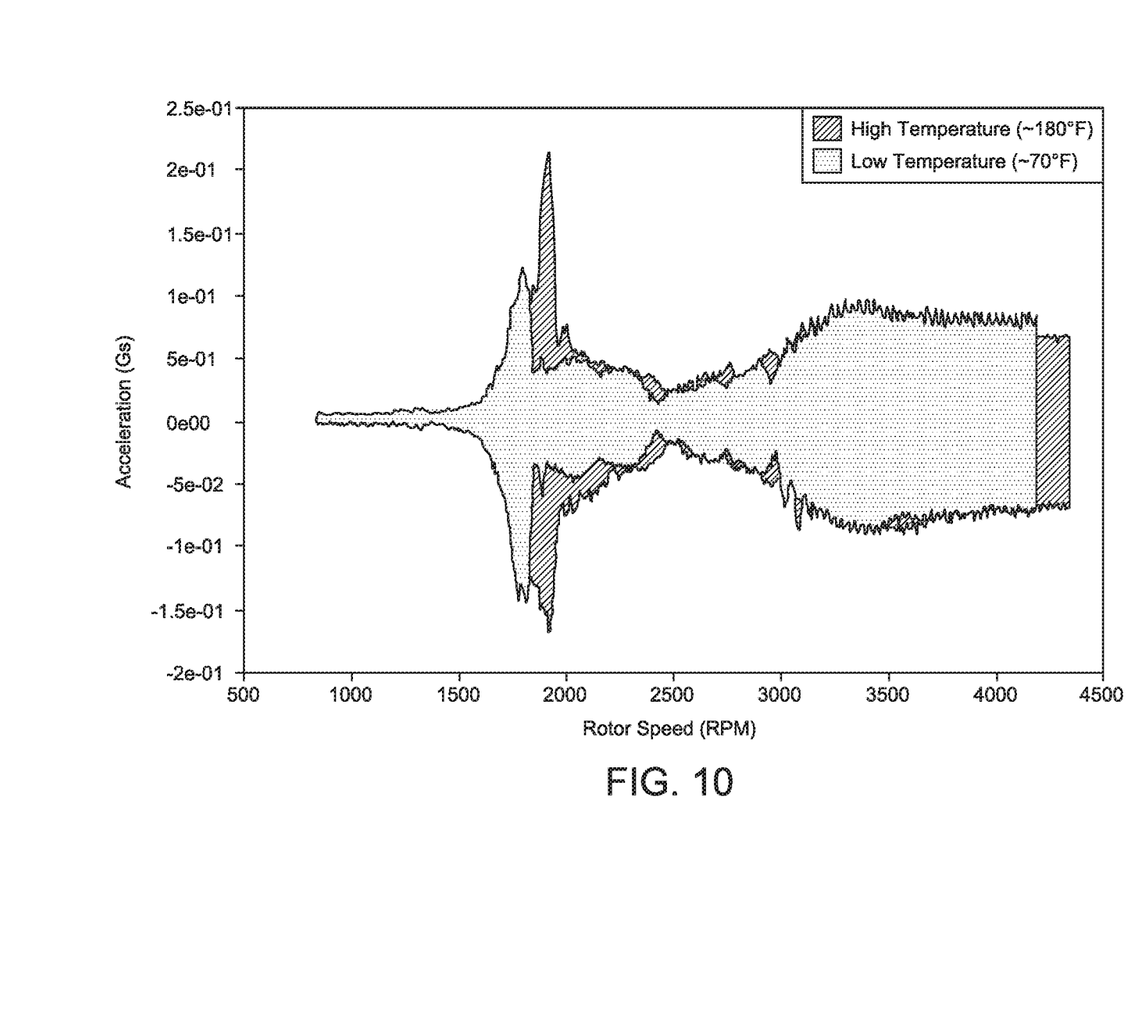
FIG. 10 graphically illustrates acceleration with respect to rotor speed of a shaft in an example gas turbine engine, in accordance with some embodiments of the present disclosure.

FIG. 10 graphically illustrates acceleration with respect to rotor speed of a shaft in an exemplary gas turbine engine. The gas turbine engine has a support assembly that includes a variable stiffness member of NiTi alloy. It can be seen from the illustration that about 0.12G peak acceleration was observed at low (~70 F) temperatures and about 0.22G peak acceleration was observed at high (~180 F) temperatures. Stiffness of the shaft and stiffness of the support assembly affect natural frequencies. High stiffness of the shaft exerts large restoring force (torque), thus producing large accelerations. The object will vibrate faster and natural frequencies will, therefore, increase. A support assembly having low stiffness lowers the natural frequencies and reduce the restoring force. In FIG. 10, it can be observed that a mode corresponding to natural frequencies varies from 1795 rpm for at low temperature to 1921 rpm for high temperature. This moving up of mode may be attributed to higher stiffness of austenite (~9 msi) as against that of martensite (~4 msi).

Figure 11:
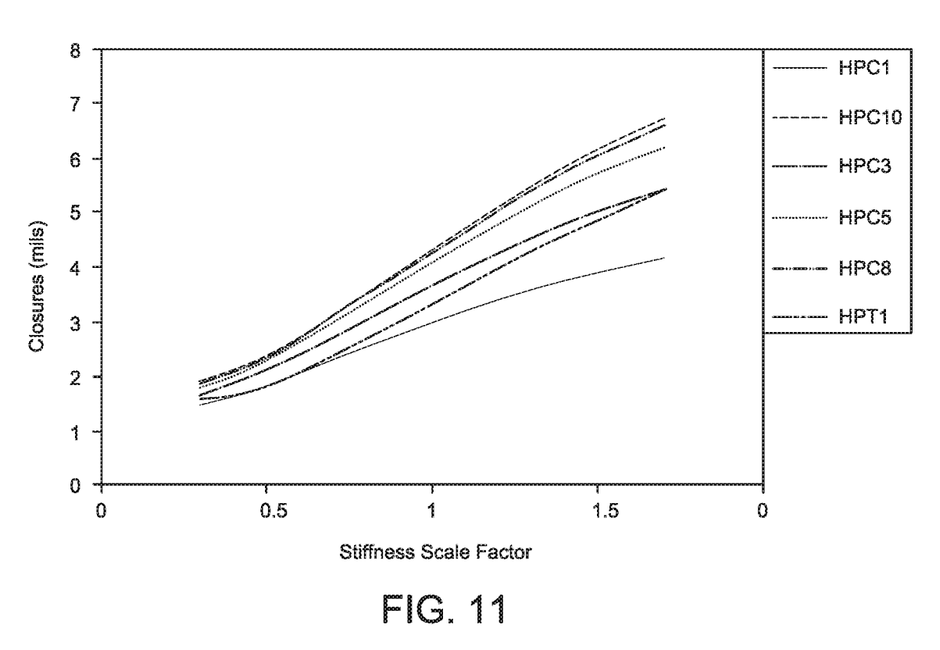
FIG. 11 graphically illustrates radial clearance of a shaft with respect to its casing as a variation with respect to normalized stiffness of the bearing, in accordance with some embodiments of the present disclosure.

A residual unbalance in a shaft may result in a localized heating, which, in turn may cause the rotor to bow or bend. This type of bow is referred to as a thermal bow, and the rotation of the shaft at this mode is called as the operation in bow mode. A thermal bow caused by a heavy rub will tend to cause an unbalance condition, causing the bow to grow in magnitude, which can cause large increases in vibration. Use of variable stiffness member for a serial dampening in the support assembly is useful for reducing the bow, as can be seen from FIG. 11. FIG. 11 shows a closure (radial clearance) of the shaft with respect to casing as a variation with respect to normalized stiffness of the support assembly for a series of high-pressure compressors and a high-pressure turbine. It can be seen that at lower stiffness levels, the closure is less than 2 mills, and the closure increases to greater than 4 mils as the stiffness of the support assembly increases. By using a variable stiffness member in the support assembly, the stiffness may be increased to provide a higher radial clearance to avoid rubbing and the stiffness may be reduced when the shaft reverts to a normal mode of operation without bow.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A support assembly for a bearing, the support assembly comprising:
a support element supporting the bearing;
a damper supporting the support element and configured to provide dampening of the bearing; and
a variable stiffness member positioned in between the damper and the bearing, the variable stiffness member configured to provide a serial dampening of the bearing with the damper, wherein the variable stiffness member comprises a shape memory alloy;
wherein the damper is a squeeze film damper.

2. The support assembly of claim 1, further comprising a static frame, wherein the support element is attached to the static frame at a first location, wherein the damper is attached to the static frame at a second location, and wherein the variable stiffness member is free of any direct attachment with the static frame.

3. The support assembly of claim 1, wherein the variable stiffness member is positioned in between the damper and the support element.

4. The support assembly of claim 1, wherein the variable stiffness member has a hairpin structure.

5. The support assembly of claim 1, wherein the shape memory alloy comprises a NiTi alloy.

6. The support assembly of claim 1, further comprising a fluid supply means to supply a fluid proximal to the variable stiffness member.

7. A gas turbine engine comprising:
a compressor section and a turbine section arranged in serial flow order;
a shaft, rotatable in at least a portion of the compressor section and at least a portion of the turbine section;
a bearing, supporting rotation of the shaft; and
a support assembly for the bearing, the support assembly comprising:
a support element supporting the bearing;
a damper supporting the support element and configured to provide dampening of the bearing; and
a variable stiffness member positioned in between the damper and the bearing, and configured to provide a serial dampening of the bearing with the damper, wherein the variable stiffness member comprises a shape memory alloy;
wherein the damper is a squeeze film damper.

8. The gas turbine engine of claim 7, wherein the variable stiffness member provides a variable stiffness along a radial direction towards a centerline axis of the gas turbine engine during normal operation of the gas turbine engine.

9. The gas turbine engine of claim 7, wherein the support assembly comprises a plurality of variable stiffness members spaced along a circumferential direction of the gas turbine engine, and wherein each of the plurality of variable stiffness members comprises the shape memory alloy.

10. The gas turbine engine of claim 7, wherein the variable stiffness member has a hairpin structure.

11. The gas turbine engine of claim 7, wherein the support assembly further comprises a static frame, wherein the support element is attached to the static frame at a first location, wherein the damper is attached to the static frame at a second location, and wherein the variable stiffness member is free of any direct attachment with the static frame.

12. The gas turbine engine of claim 11, wherein the support assembly further comprises a fluid supply means to supply a fluid proximal to the variable stiffness member.

13. The gas turbine engine of claim 7, wherein the support assembly further comprises a fluid supply means to supply a fluid proximal to the variable stiffness member.

14. The gas turbine engine of claim 7, wherein the variable stiffness member is also positioned in between the damper and the support element.

15. The gas turbine engine of claim 7, wherein the shape memory alloy comprises a NiTi alloy.

16. A method of operating a support assembly comprising: a support element supporting a bearing; a damper supporting the support element; and a variable stiffness member positioned in between the damper and the bearing, and comprising a shape memory alloy, the method comprising:
   changing in-situ a stiffness of the variable stiffness member via heat transfer between a fluid and the shape memory alloy by passing the fluid proximal to the variable stiffness member; and
   providing a serial and variable dampening of the bearing during operation of the support assembly.

17. The method of claim 16, wherein passing the fluid proximal to the variable stiffness member comprises spraying at least one of a coolant fluid or a lubricating oil on the variable stiffness member.

18. The method of claim 16, further comprising varying temperature of the fluid by passing the fluid through a heat exchanger.

19. The method of claim 16, wherein passing the fluid proximal to the variable stiffness member is in response to a control algorithm of the support assembly.

20. The method of claim 16, wherein the damper is a squeeze film damper.

* * * * *